United States Patent
Ponnan et al.

(10) Patent No.: US 10,852,920 B2
(45) Date of Patent: Dec. 1, 2020

(54) METHOD AND SYSTEM FOR AUTOMATING EXECUTION OF PROCESSES

(71) Applicant: Wipro Limited, Bangalore (IN)

(72) Inventors: Suresh Babu Ponnan, Tambaram (IN); Padmanaban Vadivel, Chennai (IN); Kumaran Sethuraman, Thanjavur (IN); Naveen Muralidharan, Tiruvallur (IN)

(73) Assignee: Wipro Limited, Bangalore (IN)

( * ) Notice: Subject to any disclaimer, the term of this patent is extended or adjusted under 35 U.S.C. 154(b) by 1034 days.

(21) Appl. No.: 15/245,223

(22) Filed: Aug. 24, 2016

(65) Prior Publication Data

US 2018/0004545 A1   Jan. 4, 2018

(30) Foreign Application Priority Data

Jun. 30, 2016 (IN) .............................. 201641022540

(51) Int. Cl.
   *G06F 3/0484* (2013.01)
   *G06F 9/451* (2018.01)
   *G06F 3/038* (2013.01)

(52) U.S. Cl.
   CPC .......... *G06F 3/04842* (2013.01); *G06F 3/038* (2013.01); *G06F 9/451* (2018.02)

(58) Field of Classification Search
   None
   See application file for complete search history.

(56) References Cited

U.S. PATENT DOCUMENTS

| | | | |
|---|---|---|---|
| 7,793,154 B2 | 9/2010 | Chagoly et al. | |
| 8,572,568 B2* | 10/2013 | Giat | G06F 11/3688 717/124 |
| 8,612,026 B2* | 12/2013 | Banik | G06F 9/45512 700/108 |
| 8,751,827 B1* | 6/2014 | Duane | G06F 21/32 713/193 |
| 8,977,904 B2* | 3/2015 | Kraus | G06F 11/3414 714/25 |
| 2003/0023874 A1* | 1/2003 | Prokupets | G06F 21/32 726/4 |
| 2004/0215357 A1* | 10/2004 | Dallet | G05B 19/409 700/83 |
| 2005/0091351 A1* | 4/2005 | Badovinatz | G06F 9/5061 709/223 |

(Continued)

*Primary Examiner* — Jennifer L Norton
(74) *Attorney, Agent, or Firm* — Finnegan, Henderson, Farabow, Garrett & Dunner, LLP

(57) ABSTRACT

The present disclosure relates to a method and system for automating execution of processes by a process automation system. The process automation system captures environment data and application data associated with at least one of applications and systems which are utilized for performing a process and records each of user actions performed on at least one of the applications and the systems with reference to the environment data. The process automation system determines one or more automation rules for each set of connected user actions within and between the at least one of the applications and the systems from the recorded user actions for execution of a corresponding activity in the process and creates an execution sequence comprising the one or more automation rules for automating the process.

15 Claims, 6 Drawing Sheets

(56) References Cited

U.S. PATENT DOCUMENTS

| | | | |
|---|---|---|---|
| 2006/0117043 A1* | 6/2006 | Dinges | G06F 17/50 |
| 2006/0259154 A1* | 11/2006 | Hood | G05B 19/4188 |
| | | | 700/2 |
| 2008/0065700 A1* | 3/2008 | Lim | G06F 21/604 |
| 2009/0089688 A1* | 4/2009 | Zhao | G06F 11/3684 |
| | | | 715/762 |
| 2010/0121968 A1* | 5/2010 | Clark | H04L 12/2818 |
| | | | 709/230 |
| 2010/0306179 A1* | 12/2010 | Lim | G06F 21/604 |
| | | | 707/688 |
| 2012/0032945 A1* | 2/2012 | Dare | G06F 3/0481 |
| | | | 345/418 |
| 2012/0054781 A1* | 3/2012 | Tzruya | G06Q 30/02 |
| | | | 719/328 |
| 2015/0012919 A1 | 1/2015 | Moss et al. | |
| 2016/0094701 A1* | 3/2016 | Hund | H04L 43/0811 |
| | | | 455/420 |
| 2018/0164892 A1* | 6/2018 | Han | G06F 3/0346 |
| 2018/0299863 A1* | 10/2018 | Caine | G05B 19/409 |

* cited by examiner

METHOD AND SYSTEM FOR AUTOMATING EXECUTION OF PROCESSES

FIELD OF THE INVENTION

The present subject matter is related in general to field of process automation, more particularly, but not exclusively to a method and system for automating execution of a process.

BACKGROUND

In a typical business environment, large number of business processes are performed regularly. These processes involve a combination of people, money, technology etc., and are generally critical to operation of an organization. However, the processes may be performed differently depending upon the diversity within the organization and on the intervention of the people who have a varying level of experience and skills. The processes generally operate in the customer environment where the user performs most of the transactions. With the rapid advancement in computer technology, complex processes can now be automated. However, the existing technologies in the automation field fail in providing efficient automation which can be reused across similar processes of other organization.

In the existing techniques, the process automation is carried out based on a number of factors. As, user perform most of the transaction for processes in the customer environment, automation of these processes require a lot of approvals. In addition, the existing techniques may not be configurable to automate similar processes. Also, the existing technique of automating fails in scenarios where a number of computing devices are utilized for carrying out a process.

Thus in the existing scenario, automating the execution of a process where a number of applications are involved becomes difficult. In addition, the existing technologies do not provide any option of configuring the automation of a number of functionalities of the process for instance, decision making, looping conditions and identification of manual steps. Also, some of the manual steps in the processes are required to be done repetitively. This leads to wastage of time and inaccuracies due to the manual intervention. Consequently, there is a need for a method and system which automates the execution of the process in an efficient way.

SUMMARY

In an embodiment, the present disclosure relates to a method for automating execution of a process. The method comprises capturing environment data and application data associated with at least one of applications and systems utilized for performing a process, recording each of user actions performed on at least one of the applications and the systems with reference to the environment data, determining one or more automation rules for each set of connected user actions within and between the at least one of the applications and the systems from the recorded user actions for execution of a corresponding activity in the process and creating an execution sequence comprising the one or more automation rules for automating the process.

In an embodiment, the present disclosure relates to a process automation system for automating execution of processes. The process automation system comprises a processor and a memory communicatively coupled to the processor, wherein the memory stores processor executable instructions, which, on execution, causes the process automation system to capture environment data and application data associated with at least one of applications and systems utilized for performing a process, record each of user actions performed on at least one of the applications and the systems with reference to the environment data, determine one or more automation rules for each set of connected user actions within and between the at least one of the applications and the systems from the recorded user actions for execution of a corresponding activity in the process and create an execution sequence comprising one or more automation rules for automating the process.

In an embodiment, the present disclosure relates to a non-transitory computer readable medium including instructions stored thereon that when processed by at least one processor cause a process automation system to capture environment data and application data associated with at least one of applications and systems utilized for performing a process, record each of user actions performed on at least one of the applications and the systems with reference to the environment data, determine one or more automation rules for each set of connected user actions within and between the at least one of the applications and the systems from the recorded user actions for execution of a corresponding activity in the process and create an execution sequence comprising one or more automation rules for automating the process.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which:

Figure 1A:
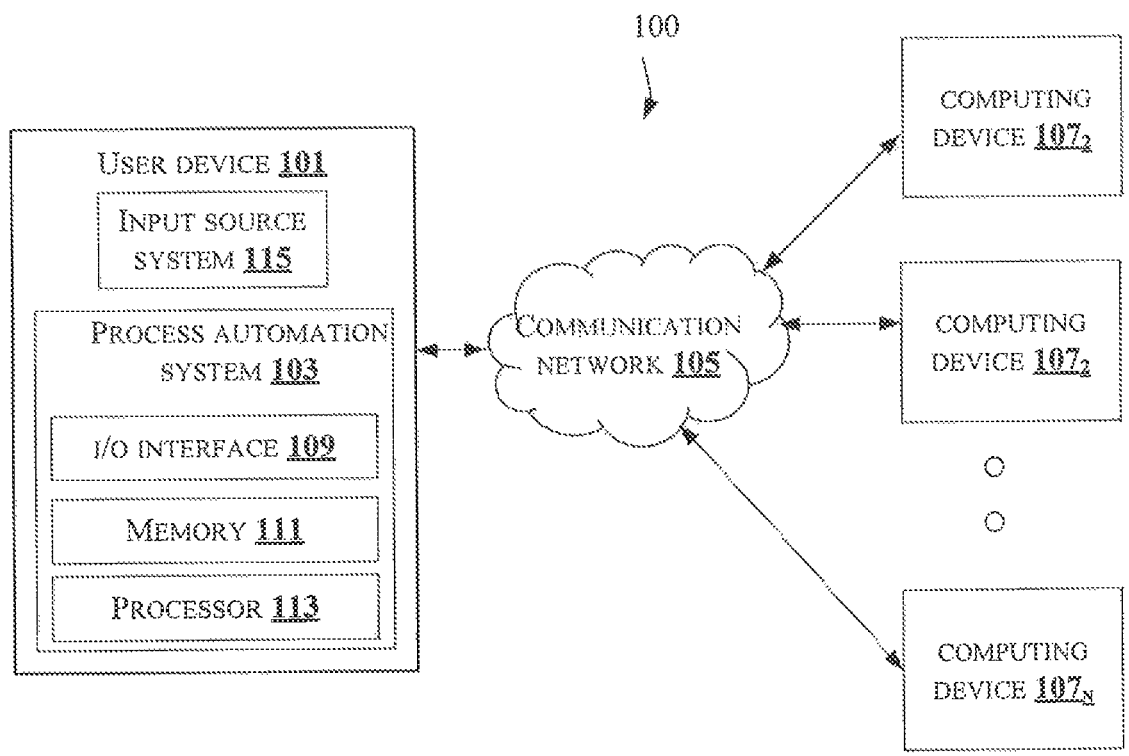
FIG. 1a illustrates an exemplary environment for automating the execution of processes in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

The present disclosure relates to a method of automating execution of processes. The method performs the automation of a process execution by determining automation rules and creating an execution sequence for the process. The present disclosure provides a process automation system which automates the execution of the processes based on captured environment data, captured application data and recorded user actions. The user actions are recorded in association with the environment data. Based on the recorded user actions, the present invention creates an execution sequence for the process. The execution sequence comprises automation rules which help in automating the process.

FIG. 1a illustrates an exemplary block diagram for automating the execution of processes in accordance with some embodiments of the present disclosure.

Figure 1B:
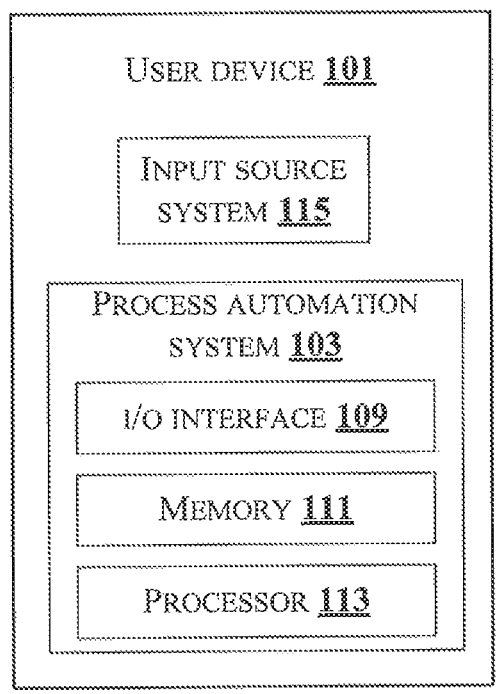
FIG. 1b illustrates an exemplary user device for automating the execution of processes in accordance with some embodiments of the present disclosure.

As shown in FIG. 1a, the environment 100 comprises a user device 101 connected to a computing device $107_1$, computing device $107_2$ . . . computing device $107_N$ (collectively referred as computing devices 107) through a wired or wireless communication network 105 The user device 101 comprises a process automation system 103 and an input source system 115. The process automation system 103 determines one or more automation rules and automates the execution of the process. The input source system 115 comprises a plurality of applications. In an embodiment, the user device 101 may include, but is not limited to, desktop computers, mobile device, laptops, tablets, notebook and any other computing device. The user device 101 implements or executes numerous processes in order to achieve a particular task. The processes on the user device 101 communicate with the numerous applications. In an embodiment, the input source system 115 of the user device 101 may include, but is not limited to, excel application, web application, windows applications, scanned documents, notepad, legacy system etc. In an embodiment, a user selects an application from the plurality of applications based on the requirement and the type of process. The process automation system 103 automates the executions of the processes on the user device 101. In order to automate the execution of the process in the user device 101, the environment data and the application data associated with at least one of the applications and systems are captured. In addition, each of the user actions performed on the at least one of applications and systems are recorded. In an embodiment, the process automation system 103 compares the recorded user actions for the process to perform at least one of eliminating duplicate user actions and identifying similarities, differences and dependencies in each of the user actions. In an embodiment, the process automation system 103 performs at least one of addition and modification of the execution sequence created from the user actions. In an embodiment, the user performs one or more actions on the at least one of application and systems. In an embodiment, the systems referred herein are the computing devices 107. In an embodiment, as shown in FIG. 1a, some of the computing devices 107 may function as an intermediary device between the user device 101 and other computing devices 107 acting as a target device. In an embodiment, as shown in FIG. 1b, a process may be executed on a single user device 101 using plurality of applications in the user device 101, without requiring any other computing devices 107. The process automation system 103 determines one or more automation rules. In an embodiment, the automation rules are the principles based on which the automation of the process is performed. The automation rules are determined for a set of a connected user actions. The set of connected user actions may be identified within and/or between the at least one of the applications and the computing devices 107 from the recorded user actions. Each of the set of the connected actions is identified for execution of a corresponding activity in the process. The set of the connected user actions comprise one or more user actions which may transform data from the user device 101 to one of the computing device 107 directly acting as the target device. Also, the one or more user actions may be transferred from the user device 101 to the computing device acting as a target device through one or more of the computing devices 107 acting as intermediary device. In an embodiment, the process automation system 103 may be present outside the user device 101 and connected directly or through a wired or wireless communication network 105.

The process automation system 103 comprises the I/O Interface 109, the memory 111 and the processor 113. The I/O interface 109 is configured to receive environment data, process data and application data associated with the plurality of applications of the process from the user device 101 when the process automation system 103 is present outside the user device 101.

The received information from the I/O interface 109 is stored in the memory 111. The memory 111 is communicatively coupled to the processor 113 of the process automation system 103. The memory 111 also stores processor instructions which cause the processor 119 to execute the instruction in order to automate the execution of the process.

Figure 2A:
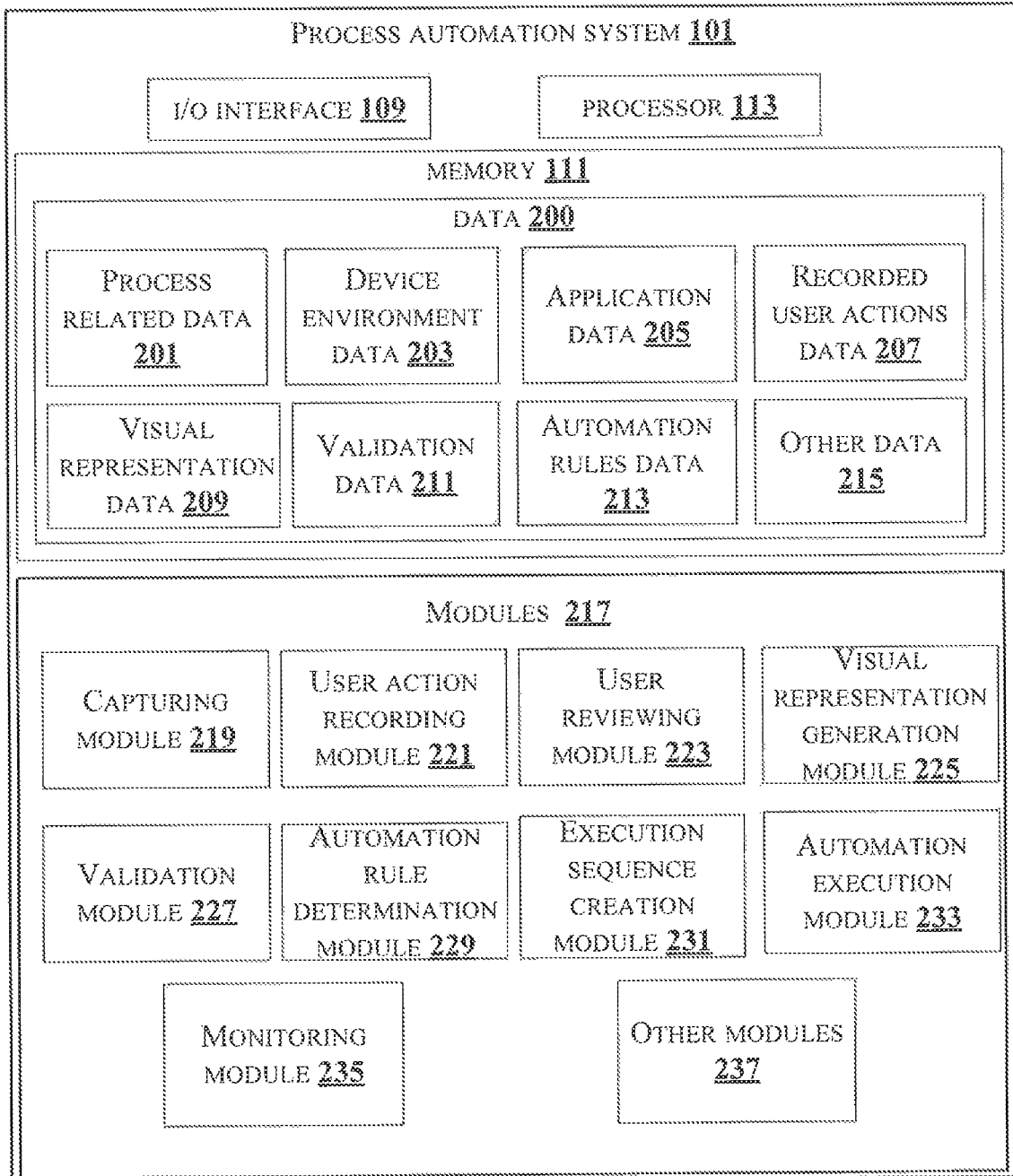
FIG. 2a shows a detailed block diagram of process automation system in accordance with some embodiments of the present disclosure.

FIG. 2a shows a detailed block diagram illustrating process automation system in accordance with some embodiments of the present disclosure.

One or more data 200 and one or more modules 217 of the process automation system 103 are described herein in detail. In an embodiment, the one or more data 200 comprises process related data 201, device environment data 203, application data 205, recorded user actions data 207, visual representation data 209, validation data 211, automation rules data 213 and other data 215 for automating the execution of processes.

The process related data 201 comprises information about the process to be automated and the level of automation required for the process. Further, the process related data 201 comprise information about the line of the organization, location, cost centre, process name, sub-process name etc. The details of the location and cost centre are captured primarily for reporting purposes. In an embodiment, the user needs to define the level at which automation is to be captured and executed depending on the input sources. In case, the input to the process is available at a sub-process level, then the automation is defined and executed at the sub process level.

The device environment data 203 comprises information about the user device 101 and the environment details associated with the process to be automation. The device environment data 203 comprises information about the operating system details, software and hardware details of the user device 101 on which the process is carried out. Further, the device environment data 203 comprises additional details like hostname details, internal protocol details, user account details, processing details, screen size details, screen resolution details, type of monitor utilized etc.

The application data 205 comprises information about the plurality of applications accessed by the user device 101 for the process under automation. The application data 205 comprises information on the type of application and various application details for example, Uniform Resource Locator (URL) details associated with the application, window ID etc. In an embodiment, the plurality of applications may include web application, windows application, mainframe application or any other Enterprise Resource Planning (ERP) applications. The application data 205 further comprises information on the controls and objects present in the application, object ID and relationship between controls and individual object properties and coordinates.

The recorded user actions data 207 comprises information about each of the actions performed by the user on the user device 101 for executing the process. The recorded user details comprise information for users login ID, citrix ID etc. The recorded user actions data 207 also comprises information about the keystrokes, mouse and cursor movement details, page up and page down details, screen details used by the user, special keys pressed, screen navigation details and various controls used by the users. In an embodiment, the control details comprises information on the controls with which the user interacts for example, text box, drop down selection, combo box, buttons etc. The control details comprises information about the control name, control ID, parent and child controls, if any, label details corresponding to each controls, grid details in case the control is a part of the grid and the location of the control including the coordinates value, relationship details between labels and controls, details of independent and dependent controls. Further, the recorded user actions data 207 also comprises information about the verified recorded user actions. In an embodiment, verification of the recorded user actions is performed by the user in order to provide correct sequence of actions for the process.

The visual representation data 209 comprises the visual representation of the recorded user actions for the execution of the process. The visual representation of the process is provided to the user in order to make any changes in the execution of the process and for validation of the process execution.

The validation data 211 comprises information about the user defined rules and the pre-defined validation rules based on which each of the recorded user actions are validated. The validation data 211 further comprises information about the decision rules, looping logics, mathematical logics and logical operations.

The automation rules data 213 comprises information about the one or more automation rules determined from the recorded user actions. The automation rules are determined based on user inputs. The automation rules data 213 further comprises information about source computing environment, the target computing environment, environment details, data and attributes of the data associated with each set of the connected user actions.

The other data 215 may store data, including temporary data and temporary files, generated by modules for performing the various functions of the process automation system 103.

In an embodiment, the one or more data 200 in the memory 111 are processed by the one or more modules 217 of the process automation system 103. As used herein, the term module refers to an application specific integrated circuit (ASIC), an electronic circuit, a field-programmable gate arrays (FPGA), Programmable System-on-Chip (PSoC), a combinational logic circuit, and/or other suitable components that provide the described functionality. The said modules when configured with the functionality defined in the present disclosure will result in a novel hardware.

In one implementation, the one or more modules 217 may include, for example, a capturing module 219, user action recording module 221, user reviewing module 223, visual representation generation module 225, validation module 227, an automation rule determination module 229, an execution sequence creation module 231, automation execution module 233, and monitoring module 235.

Figure 2B:
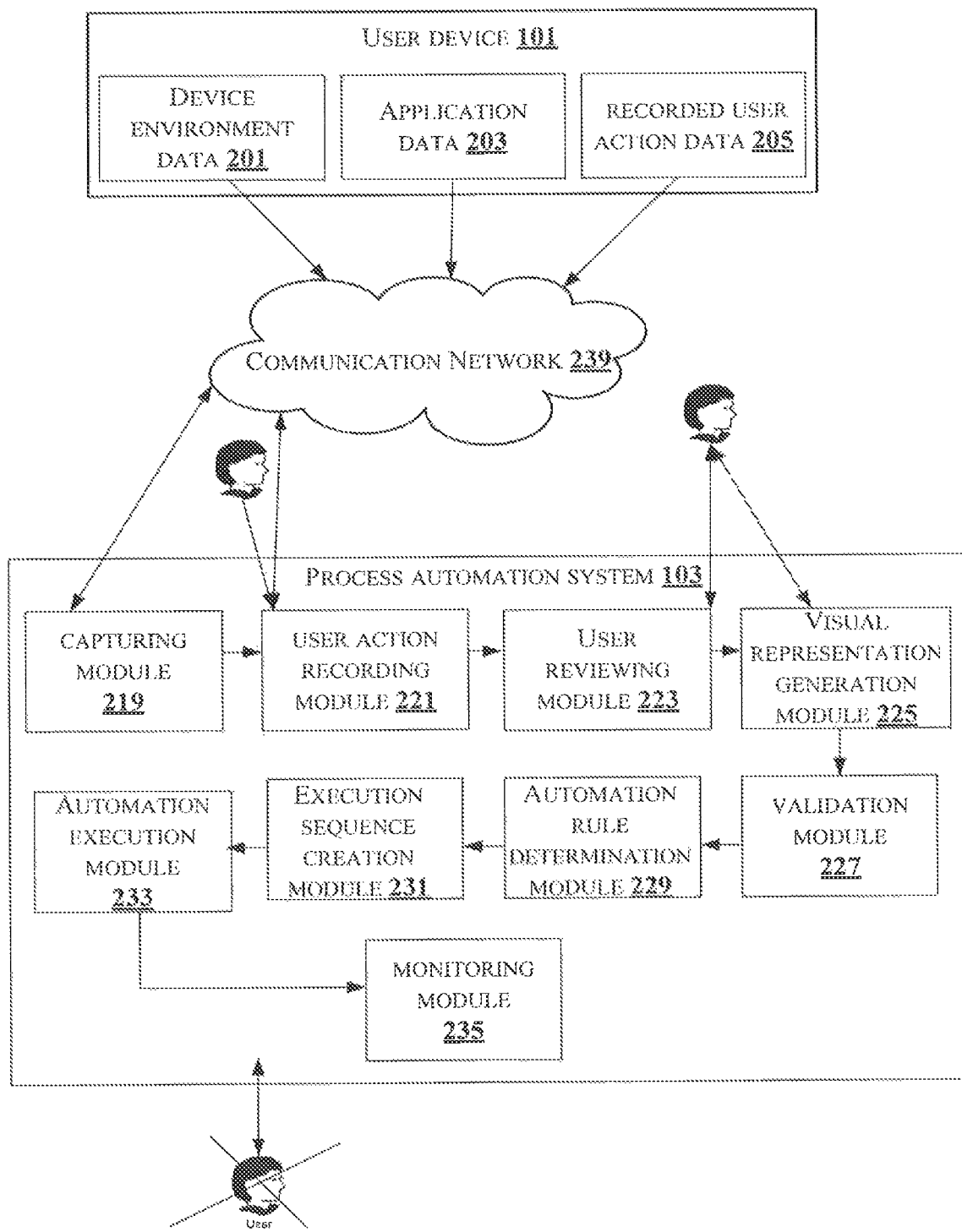
FIG. 2b shows an exemplary environment illustrating data flow between different modules of process automation system in accordance with some embodiment of the present disclosure.

The one or more modules 217 may also comprise other modules 237 to perform various miscellaneous functionalities of the process automation system 103. It will be appreciated that such aforementioned modules may be represented as a single module or a combination of different modules. FIG. 2b shows an exemplary environment illustrating data flow between different modules of process automation system in accordance with some embodiment of the present disclosure.

The capturing module 219 captures the process related data 201 from the user device 101. In an embodiment, the process related data 201 are captured for identifying the scenarios of automation. For example, the level at which the automation is required to be performed, automation at process or sub-process level etc. The capturing module 219 further captures the environment data and the application data associated with at least one of the applications and systems for performing a process. The capturing module 219 captures the details of the environment where the process is present and also the details of all the applications accessed by the user. In addition, the capturing module 219 also detects and identifies the type of applications being used by the user. Further, the information about the resolution of screen, screen size and position are also captured by the capturing module 219. For example, in a banking organization, if a process is an account opening process, a banking application is opened by the user for creating the account and under banking application account creation is selected. The capturing module 219 captures the environment details where the banking application is running. For instance the environment details may be operating system details, version of the operating system used such as windows 10, Linux etc., and processing data of the system such as the processor details, memory details etc. Further, the display details of the system in which the user enters the details associated with the creation of account are captured. The display details may comprise size of the monitor, resolution of monitor, brightness of monitor etc. The capturing module 219 also captures the details of all the controls used in the identified applications. In an embodiment, the capturing module 219 detects and identifies all the controls present in the application along with their relationship. Further, the controls captured comprises the controls used by the users for example, text box, drop down selection, buttons etc.

The user action recording module 221 records each of the user details and user actions performed by the user for execution of the process in at least one of the applications and systems. The user actions recorded for the process may comprise information about at least one of type of keystrokes made by the user, mouse and cursor movement details, screen navigations, screen details, objects etc. For example, in the exemplary banking application described above where the process is the account opening process, the details about the actions which the users may perform are recorded. The sequence of actions performed by users for opening the account may comprise selecting the type of the account like individual, joint, NRI account etc., text boxes being filled by users, any mouse click or any keys pressed through keyboard and any other sequences of user actions. Further, the user action recording module 221 also records the various use of the controls used in the execution of the process.

The functionality of the user reviewing module 223 is to provide the user the recorded user actions for the process for reviewing. In the user reviewing module 223, the user of the process reviews and confirms if all the actions are captured correctly by the user action recording module 221. For example, it may be possible that the user may have performed some unwanted steps or there may be some system generated or application specific pops ups which may have been recorded along with the user actions. The user reviewing module 223 allows the users to view the user actions recorded, verify all the recorded actions, modify any user actions, rearrange any sequences of actions and delete any unwanted actions. Further, at times, there may be certain user actions or steps which may require user inputs or are based on certain logical thinking and are complex to automate. The user in the user reviewing module 223 marks these steps as manual. In an embodiment, the user marked manual steps may not be mandatory and be used in case of required.

The visual representation generation module 225 generates the visual representation for each of the reviewed recorded user action for the users. The visual representation generation module 225 generates the visual representation for the execution process based on the captured environment data, application data and the reviewed recorded user action. In an embodiment, the visual representation of the process execution comprises an application page which is recreated based on the screen resolution properties and the controls as used at the time of recording each of the user actions. In an embodiment, at the time of visualization, the process is monitored for execution, log date, synchronize data logs, update execution output and update error details if any.

The validation module 227 validates each of the user actions recorded for the execution of the process in the generated visual representation based on at least one of user defined rules and pre-defined validation rules. In an embodiment, the visual representation is provided to the user, where the user validates each of the recorded user actions. In an embodiment, the user may define properties for each of the individual controls like text box, drop down values etc. The properties may include the list of allowed values, restrictions on length, calculation logic, conditional validations etc. The list of validation comprises validating length of the process, numeric validations for instance greater than, less than, equal to and not equal to etc., list of the allowed values, conditional validations based on the fields and data and validation of simple mathematical logic or calculations based on the available data or values.

The automation rule determination module 229 determines one or more automation rules for a set of the connected user actions. The automation rule determination module 229 determines the set of the connected user actions from the validated recorded user actions within and between the at least one of the applications and the systems for execution of a corresponding activity in the process. For example, in the exemplary banking application illustrated above, if the application for opening an account is for an individual type and the account type is selected as current then the corresponding determined automation rule is invoked for automation. Similarly, if the application type for opening the account is individual type and the account type is selected as savings then the corresponding determined automation rule is used for automation. Further, the automation rule determination module 291 determines the automation rules based on the user inputs provided by the users. In an embodiment, the user inputs comprises information about at least one of identification of manual events from the user actions, specification of one or more looping conditions in each of the user actions and verification and modification of the user actions.

The execution sequence creation module 231 creates the execution sequence for the process under automation. In an embodiment, the execution sequences are created in Extensible Markup Language (XML). The execution sequence creation module 231 creates the execution sequence of the process based on the generated visual representation of the process and the one or more automation rules. In an embodiment, the execution sequence creation module 231 comprises at least one of addition and modification of the execution sequence. In an embodiment, the pre-processing of the user actions is performed before the actual automation of the process. The pre-processing of the process is performed to ensure that there is no impact on the actual user data.

The automation execution module 233 executes the automation for the process. The automation execution module 233 uses the captured process related data, the visual representation of the user actions for the process and the one or more automation rules for the process in execution to identify the source of the automation execution. In an embodiment, the automation execution module 233 is a generic execution module which is independent of the automation execution process. This way, the automation execution module 233 remains same, irrespective of the process and the only change is in the data captured. Thus, the present disclosure automates any type of processes based on the data captured. In an embodiment, the automation execution module 233 also performs a check of the execution environment. The execution environment check comprises validation of the system resolution with that used in the automation capture, ensuring if all the applications and uniform resource locators are accessible, verification of the screen size, validation of the entire set of control ids, control types to determine any change in the application etc. In addition, the automation execution module 233 maintains detailed logs of all the events, timestamps and errors if any and all system generated messages.

The monitoring module 235 monitors each of the automation running across multiple connected systems. In an embodiment, the monitoring module 235 facilitates scheduled execution of processes by specifying fixed time of execution. The monitoring module 235 comprises the details of the internet protocol, hostname etc., of all the automation. Further, the monitoring module 235 also monitors and synchronizes all the application level data as well as logs maintained in the user device 101.

Figure 3:
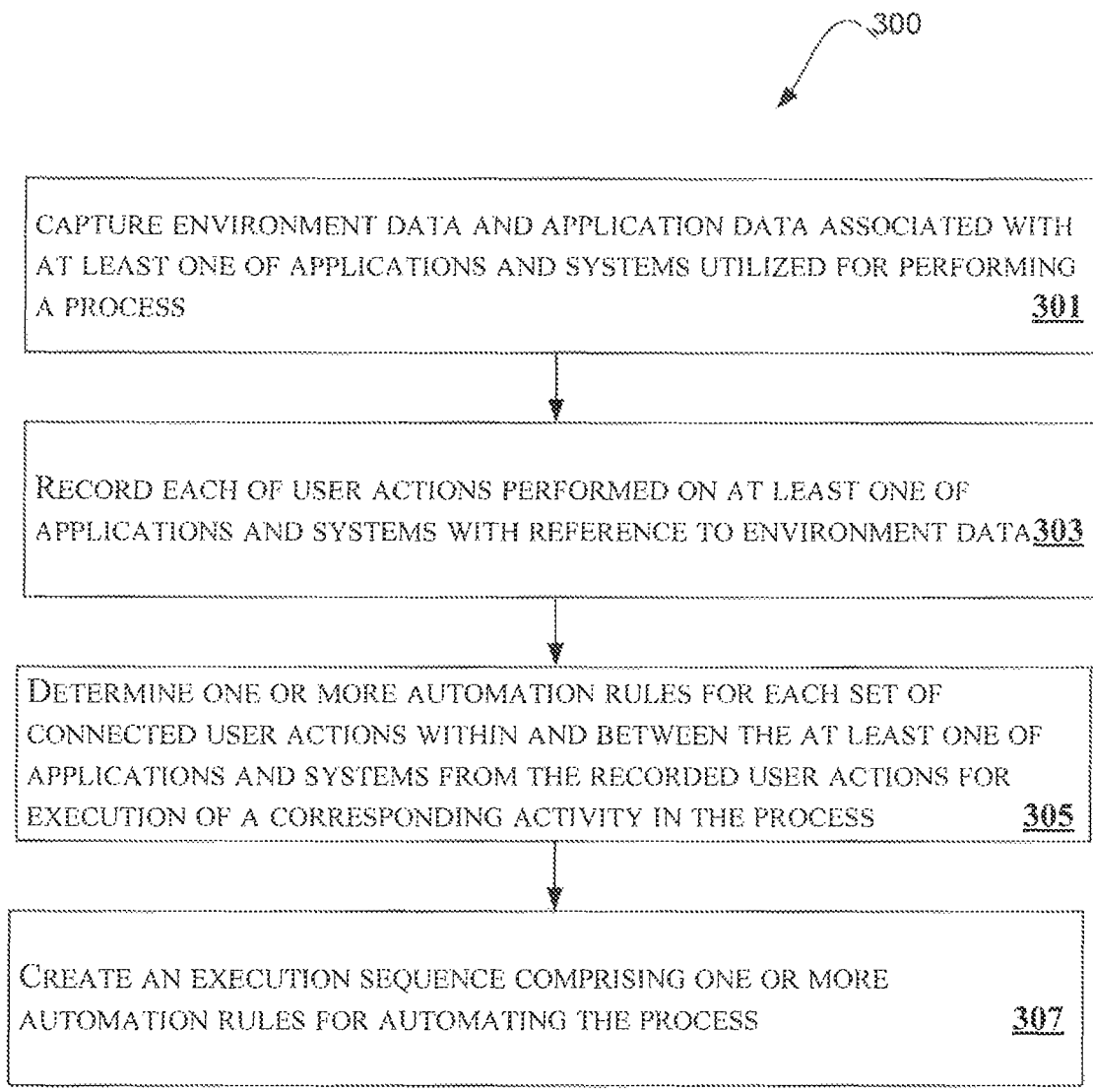
FIG. 3 illustrates a flowchart showing a method for automating execution of processes in accordance with some embodiments of present disclosure.

FIG. 3 illustrates a flowchart showing a method for automating execution of processes in accordance with some embodiments of present disclosure.

As illustrated in FIG. 3, the method 300 comprises one or more blocks for automating execution of processes. The method 300 may be described in the general context of computer executable instructions. Generally, computer executable instructions can include routines, programs, objects, components, data structures, procedures, modules, and functions, which perform particular functions or implement particular abstract data types.

The order in which the method 300 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At block 301, the process automation system 103 captures environment data and application data associated with at least one of applications and systems utilized for performing a process.

At block 303, the process automation system 103 records each of user actions performed on at least one of the applications and the systems with reference to the environment data.

At block 305, the process automation system 103 determines one or more automation rules for each set of connected user actions within and between the at least one of the applications and the systems from the recorded user actions for execution of a corresponding activity in the process.

At block 307, the process automation system 103 creates an execution sequence comprising one or more automation rules for automating the process.

Computing System

Figure 4:
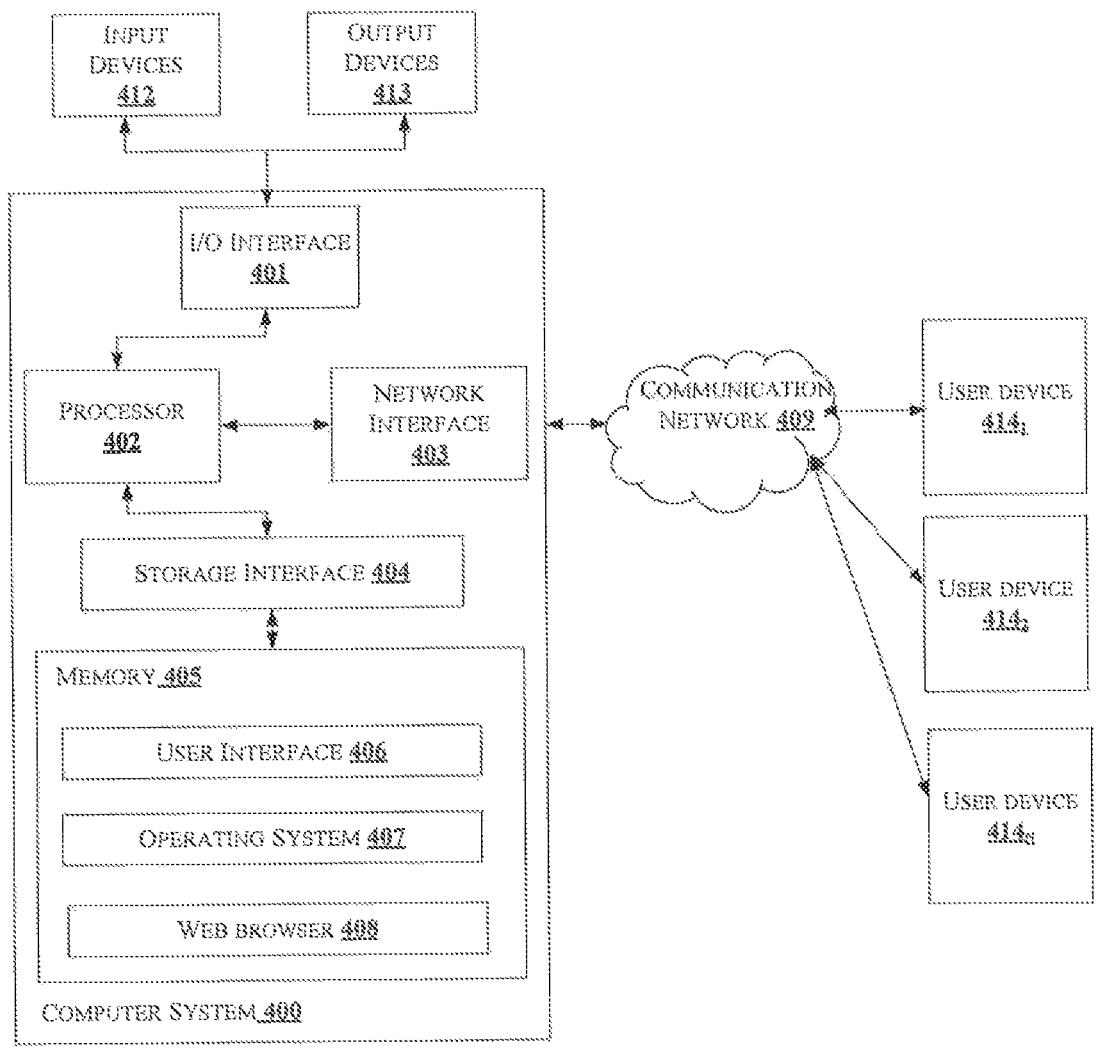
FIG. 4 illustrates a block diagram of an exemplary computer system for implementing embodiments consistent with the present disclosure.

FIG. 4 illustrates a block diagram of an exemplary computer system 400 for implementing embodiments consistent with the present disclosure. In an embodiment, the computer system 400 is used to implement the process automation system. The computer system 400 may comprise a central processing unit ("CPU" or "processor") 402. The processor 402 may comprise at least one data processor for automating execution of processes. The processor 402 may include specialized processing units such as integrated system (bus) controllers, memory management control units, floating point units, graphics processing units, digital signal processing units, etc.

The processor 402 may be disposed in communication with one or more input/output (I/O) devices (not shown) via I/O interface 401. The I/O interface 401 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 401, the computer system 400 may communicate with one or more I/O devices. For example, the input device may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output device may be a printer, fax machine, video display (e.g., cathode ray tube (CRT), liquid crystal display (LCD), light-emitting diode (LED), plasma, Plasma display panel (PDP), Organic light-emitting diode display (OLED) or the like), audio speaker, etc.

In some embodiments, the computer system 400 consists of a process automation system. The processor 402 may be disposed in communication with the communication network 409 via a network interface 403. The network interface 403 may communicate with the communication network 409. The network interface 403 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 409 may include, without limitation, a direct interconnection, local area network (LAN), wide area network (WAN), wireless network (e.g., using Wireless Application Protocol), the Internet, etc. Using the network interface 403 and the communication network 409, the computer system 400 may communicate with the user device 414. The network interface 403 may employ connection protocols include, but not limited to, direct connect, Ethernet (e.g., twisted pair 10/100/1000 Base T), transmission control protocol/internet protocol (TCP/IP), token ring, IEEE 802.11a/b/g/n/x, etc.

The communication network 409 includes, but is not limited to, a direct interconnection, an e-commerce network, a peer to peer (P2P) network, local area network (LAN), wide area network (WAN), wireless network (e.g., using Wireless Application Protocol), the Internet, Wi-Fi and such. The first network and the second network may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the first network and the second network may include a variety of network devices, including routers, bridges, servers, computing devices, storage devices, etc.

In some embodiments, the processor 402 may be disposed in communication with a memory 405 (e.g., RAM, ROM, etc. not shown in FIG. 3) via a storage interface 404. The storage interface 404 may connect to memory 405 including, without limitation, memory drives, removable disc drives, etc., employing connection protocols such as serial advanced technology attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 405 may store a collection of program or database components, including, without limitation, user interface 406, an operating system 407, web browser 408 etc. In some embodiments, computer system 400 may store user/application data 406, such as the data, variables, records, etc. as described in this disclosure. Such databases may be implemented as fault-tolerant, relational, scalable, secure databases such as Oracle or Sybase.

The operating system 407 may facilitate resource management and operation of the computer system 400. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like.

In some embodiments, the computer system 400 may implement a web browser 408 stored program component. The web browser 408 may be a hypertext viewing application, such as Microsoft Internet Explorer, Google Chrome, Mozilla Firefox, Apple Safari, etc. Secure web browsing may be provided using Secure Hypertext Transport Protocol (HTTPS), Secure Sockets Layer (SSL), Transport Layer Security (TLS), etc. Web browsers 408 may utilize facilities such as AJAX, DHTML, Adobe Flash, JavaScript, Java, Application Programming Interfaces (APIs), etc. In some embodiments, the computer system 400 may implement a mail server stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as Internet Message Access Protocol (IMAP), Messaging Application Programming Interface (MAPI), Microsoft Exchange, Post Office Protocol (POP), Simple Mail Transfer Protocol (SMTP), or the like. In some embodiments, the computer system 400 may implement a mail client stored program component. The mail client may be a mail viewing application, such as Apple Mail, Microsoft Entourage, Microsoft Outlook, Mozilla Thunderbird, etc.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include Random Access Memory (RAM), Read-Only Memory (ROM), volatile memory, non-volatile memory, hard drives, CD ROMs, DVDs, flash drives, disks, and any other known physical storage media.

An embodiment of the present disclosure helps in automating the execution of any type of processes and supports any type of applications.

An embodiment of the present disclosure automates a process which is executed at multiple systems.

An embodiment of the present disclosure displays the sequences of the user actions to the users for visualizing the sequence of actions which will be performed for automation.

The present disclosure provides an effective ability to reuse and combine the existing recorded user actions.

An embodiment of the present disclosure provides a high level of configurability.

The present disclosure requires a very limited human interference as shown in FIG. 2b. As shown in the figure, the automation process requires the human intervention only at the time of recording the actions performed and at the time of generating the visual representation.

An embodiment of the present disclosure provides an ability to configure automation rules based on the available inputs and transaction generated metadata.

The described operations may be implemented as a method, system or article of manufacture using standard programming and/or engineering techniques to produce software, firmware, hardware, or any combination thereof. The described operations may be implemented as code maintained in a "non-transitory computer readable medium", where a processor may read and execute the code from the computer readable medium. The processor is at least one of a microprocessor and a processor capable of processing and executing the queries. A non-transitory computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. Further, non-transitory computer-readable media comprise all computer-readable media except for a transitory. The code implementing the described operations may further be implemented in hardware logic (e.g., an integrated circuit chip, Programmable Gate Array (PGA), Application Specific Integrated Circuit (ASIC), etc.).

Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a non-transitory computer readable medium at the receiving and transmitting stations or devices. An "article of manufacture" comprises non-transitory computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the invention, and that the article of manufacture may comprise suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 4 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERRAL NUMERALS

| Reference Number | Description |
| --- | --- |
| 100 | Environment |
| 101 | User device |
| 103 | Process automation system |
| 105 | Communication network |
| 107 | computing devices |
| 109 | I/O interface |
| 111 | Memory |
| 113 | Processor |
| 115 | Input source system |
| 200 | Data |
| 201 | Process related data |
| 203 | Device environment data |
| 205 | Application data |
| 207 | Recorded user actions data |
| 209 | Visual representation data |
| 211 | Validation data |
| 213 | Automation rules data |
| 215 | Other data |
| 217 | Modules |
| 219 | Capturing module |
| 221 | User action recording module |
| 223 | User reviewing module |
| 225 | Visual representation generation module |
| 227 | Validation module |
| 229 | Automation rule determination module |
| 231 | Execution sequence creation module |
| 233 | Automation execution module |
| 235 | Monitoring module |
| 237 | Other modules |

What is claimed is:

1. A method for automating execution of processes, the method comprising:

capturing, by a process automation system, environment data and application data associated with at least one of applications and systems utilized for performing a process;

recording, by the process automation system, each user action performed on at least one of the applications and the systems with reference to the environment data for execution of a corresponding activity in the process;

comparing, by the process automation system, a plurality of recorded user actions for the execution of the corresponding activity in the process, to perform at least one of eliminating duplicate user actions and identifying similarities, differences, and dependencies in each of the compared plurality of recorded user actions;

generating, by the process automation system, a visual representation of the execution of the corresponding activity in the process based on the environment data, application data, and the recorded user actions;

validating, by the process automation system, each of the recorded user actions in the generated visual representation based on at least one of user defined rules and pre-defined validation rules, wherein the validation comprises providing decision rules, looping logics, mathematical logics and logical operations;

determining, by the process automation system, one or more automation rules for each set of connected user actions performed within and between the at least one of the applications and the systems from the validated recorded user actions for the execution of the corresponding activity in the process; and creating, by the process automation system, an execution sequence comprising the one or more automation rules for automating the process.

2. The method as claimed in claim 1, wherein the environment data comprise information about operating system details, software and hardware information, hostname details, screen resolution details, user account details, processing details, screen size details and type of monitor used.

3. The method as claimed in claim 1, wherein the application data comprises information on type of application, window identification, application uniform resource locator, information of all controls and objects in an application, object ID and relationship between controls and individual object properties and coordinates.

4. The method as claimed in claim 1 further comprises performing at least one of addition and modification of the execution sequence.

5. The method as claimed in claim 1, wherein each user action comprises information about types of keystrokes, mouse and cursor movement, details of control, objects, and screen details used by a user.

6. The method as claimed in claim 5, wherein the details of the control comprise control name, control ID, parent-child relationship, relationship details between labels and controls, details of independent and dependent controls, grid details if a control is part of a grid and location of the controls along with coordinate data.

7. The method as claimed in claim 1, wherein the one or more automation rules are determined based on user inputs.

8. The method as claimed in claim 7, wherein the user inputs comprise at least one of identification of manual events from the user actions, specification of one or more looping conditions in each of the user actions and verification and modification of the recorded user actions.

9. The method as claimed in claim 1, wherein the one or more automation rules comprises information about source computing environment, target computing environment, environment details, data and attributes of data associated with each set of connected user actions.

10. The method as claimed in claim 1, wherein a set of connected user actions comprises one or more user actions, wherein the one or more user actions transform data from at least one of a source computing environment to a target computing environment and from a source computing environment through at least one or more intermediary computing environments to a target computing environment.

11. A process automation system for automating execution of processes comprising:
a processor; and
a memory communicatively coupled to the processor, wherein the memory stores processor instructions, which, on execution, causes the processor to:
capture environment data and application data associated with at least one of applications and systems utilized for performing a process;
record each user action performed on the at least one of the applications and the systems with reference to the environment data for execution of a corresponding activity in the process;
compare a plurality of recorded user actions for the execution of the corresponding activity in the process, to perform at least one of eliminating duplicate user actions and identifying similarities, differences, and dependencies in each of the compared plurality of recorded user actions;
generate a visual representation of the execution of the corresponding activity in the process based on the environment data, application data, and the recorded user actions;
validate each of the recorded user actions in the generated visual representation based on at least one of user defined rules and pre-defined validation rules, wherein the validation comprises providing decision rules, looping logics, mathematical logics and logical operations;
determine one or more automation rules for each set of connected user actions performed within and between the at least one of the applications and the systems from the validated recorded user actions for the execution of the corresponding activity in the process; and
create an execution sequence comprising the one or more automation rules for automating the process.

12. The process automation system as claimed in claim 11, wherein the processor performs at least one of addition and modification of the execution sequence.

13. The process automation system as claimed in claim 11, wherein the one or more automation rules comprises information about source computing environment, target computing environment, environment details, data and attributes of data associated with each set of connected user actions.

14. The process automation system as claimed in claim 11, wherein a set of connected user actions comprises one or more user actions, wherein the one or more user actions transform data from at least one of a source computing environment to a target computing environment and from a source computing environment through at least one or more intermediary computing environments to a target computing environment.

15. A non-transitory computer readable medium including instruction stored thereon that when processed by at least one processor cause a process automation system to perform operation comprising:
capturing environment data and application data associated with at least one of applications and systems utilized for performing a process;
recording each user action performed on at least one of the applications and the systems with reference to the environment data for execution of a corresponding activity in the process;
comparing a plurality of recorded user actions for the execution of the corresponding activity in the process, to perform at least one of eliminating duplicate user actions and identifying similarities, differences, and dependencies in each of the compared plurality of recorded user actions;
generating a visual representation of the execution of the corresponding activity in the process based on the environment data, application data, and the recorded user actions;
validating each of the recorded user actions in the generated visual representation based on at least one of user defined rules and pre-defined validation rules, wherein the validation comprises providing decision rules, looping logics, mathematical logics and logical operations;
determining one or more automation rules for each set of connected user actions performed within and between the at least one of the applications and the systems from the validated recorded user actions for the execution of the corresponding activity in the process; and
creating an execution sequence comprising the one or more automation rules for automating the process.

* * * * *